US010113571B2

(12) United States Patent
Kubiniec et al.

(10) Patent No.: US 10,113,571 B2
(45) Date of Patent: Oct. 30, 2018

(54) SYSTEM AND METHOD FOR JOINING PANELS

(71) Applicants: Thomas Kubiniec, Cazenovia, NY (US); Frank Girardi, Homer, NY (US)

(72) Inventors: Thomas Kubiniec, Cazenovia, NY (US); Frank Girardi, Homer, NY (US)

( * ) Notice: Subject to any disclaimer, the term of this patent is extended or adjusted under 35 U.S.C. 154(b) by 0 days.

(21) Appl. No.: 15/461,084

(22) Filed: Mar. 16, 2017

(65) Prior Publication Data

US 2018/0266459 A1  Sep. 20, 2018

(51) Int. Cl.
| | |
|---|---|
| A47B 43/00 | (2006.01) |
| F16B 5/00 | (2006.01) |
| A47B 47/03 | (2006.01) |
| A47B 96/14 | (2006.01) |
| E04H 9/00 | (2006.01) |
| A47B 81/00 | (2006.01) |

(52) U.S. Cl.
CPC ............ *F16B 5/0084* (2013.01); *A47B 47/03* (2013.01); *A47B 81/005* (2013.01); *A47B 96/1408* (2013.01); *E04H 9/00* (2013.01)

(58) Field of Classification Search
CPC ..................................................... A47B 47/03
USPC ................................ 312/257.1, 265.1–265.6
See application file for complete search history.

(56) References Cited

U.S. PATENT DOCUMENTS

| | | | | | |
|---|---|---|---|---|---|
| 3,087,768 A | * | 4/1963 | Mack | ................. | A47B 47/0008 312/263 |
| 3,879,144 A | * | 4/1975 | Eckerbrecht | ......... | A47B 57/402 211/191 |
| 4,154,493 A | * | 5/1979 | Prater | ...................... | H02B 1/46 312/108 |
| 5,165,770 A | * | 11/1992 | Hahn | ..................... | A47B 47/05 211/26 |
| 5,897,180 A | * | 4/1999 | Singer | .................... | A47B 47/05 312/223.2 |
| 5,915,803 A | * | 6/1999 | Daugherty | ............. | A47B 46/00 312/263 |
| 5,932,843 A | * | 8/1999 | Besserer | ................ | H05K 7/183 174/50 |
| 6,012,791 A | * | 1/2000 | Benner | ................... | H02B 1/301 312/265.2 |
| 6,041,557 A | * | 3/2000 | Brown | ................ | E04D 13/0315 52/200 |
| 6,273,533 B1 | * | 8/2001 | Nicolai | .................... | H02B 1/01 211/182 |
| 2006/0032412 A1 | * | 2/2006 | Harner | ................... | B65D 19/06 108/55.1 |

* cited by examiner

*Primary Examiner* — Matthew W Ing

(57) ABSTRACT

A cabinet includes a plurality of cabinet panels coupled together to form a cabinet. At least two adjoining panels are joined together by a rail lock and cleat tab joining structure which includes a flange strip extending from an adjoining side edge of each of the at least two adjoining panels. A rail lock and cleat tab joining structure includes a rail lock having a plurality of taper locks. Each cleat tab of a first panel is substantially aligned with each cleat tab of a second panel to form a pair of aligned cleat tabs. The pair of aligned cleat tabs is captured together by an interference fit with tapered edges of each corresponding taper lock to form a seam joining the first panel to the second panel. A gun cabinet, a safety shelter or safe room, and a method for joining two adjacent panels is also described.

20 Claims, 8 Drawing Sheets

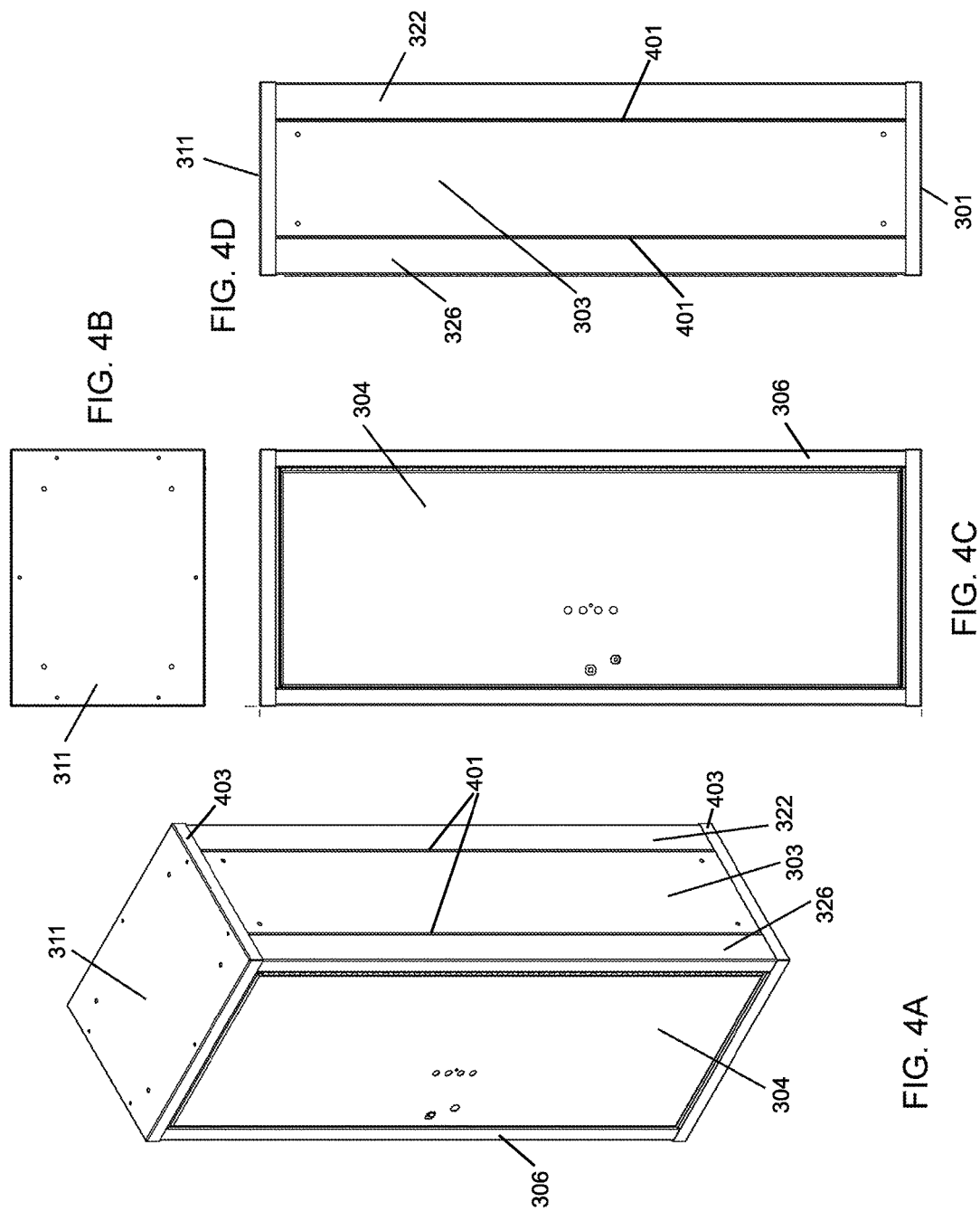

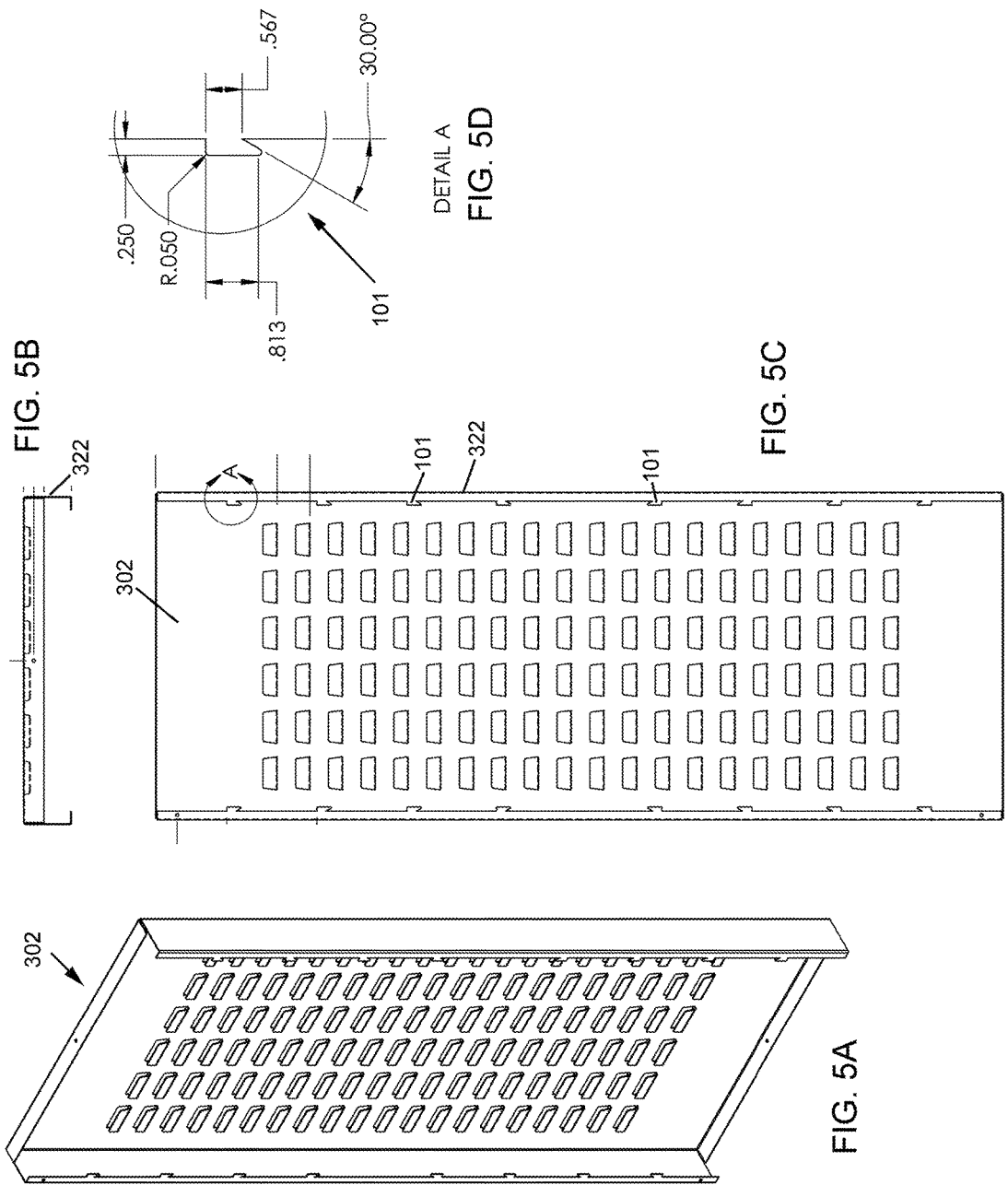

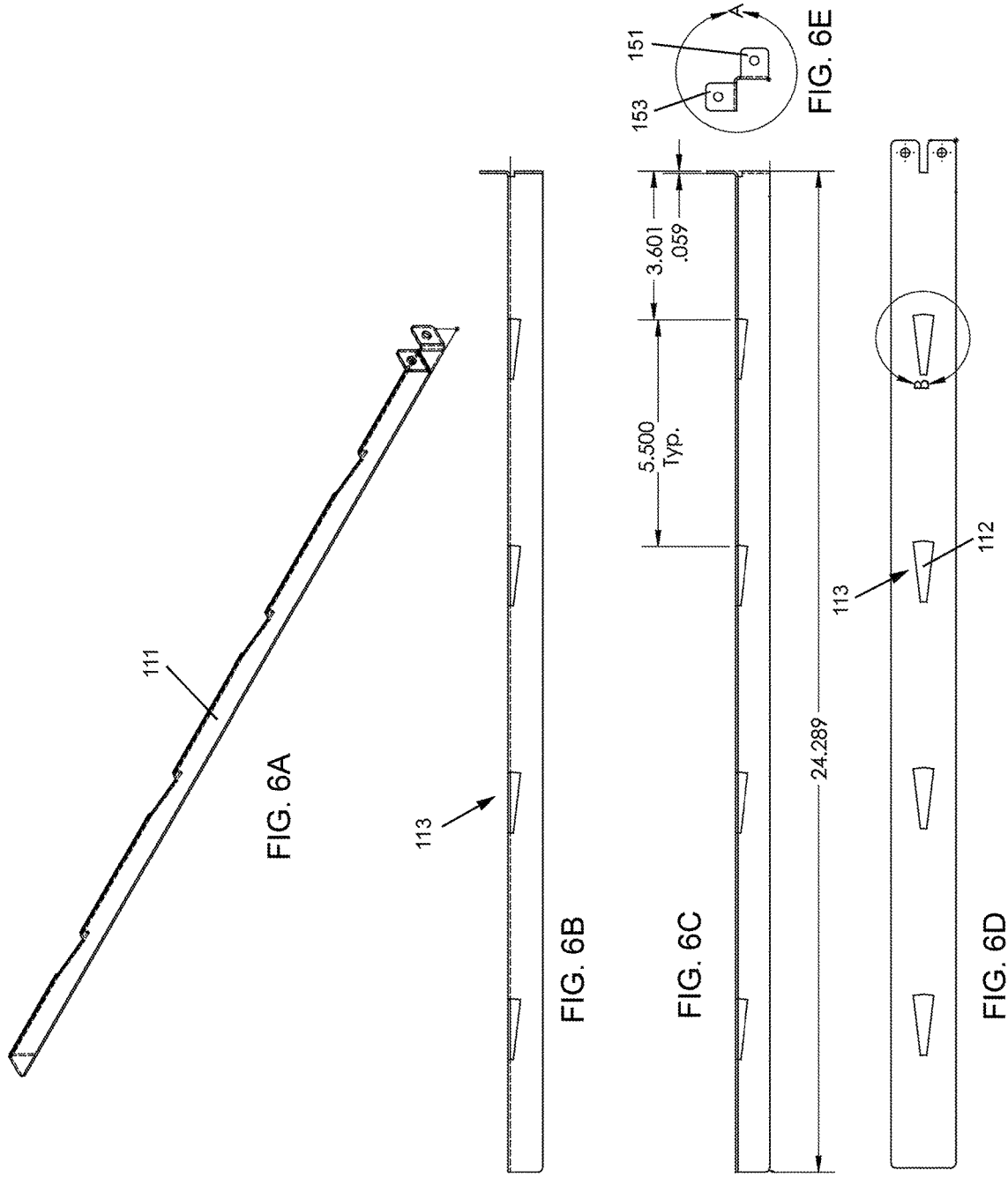

SYSTEM AND METHOD FOR JOINING PANELS

FIELD OF THE APPLICATION

The application relates to joining panels and particularly to joining adjacent panels.

BACKGROUND

Enclosures typically include four walls, a top, and a bottom surface. In many common applications ranging from cabinets to storm shelters and safe rooms, panels are joined together to form the enclosure. Such panels are generally bolted or welded together.

SUMMARY

According to one aspect, a cabinet includes a plurality of cabinet panels coupled together to form a cabinet. At least two adjoining panels of the plurality of cabinet panels are joined together by a rail lock and cleat tab joining structure which includes a flange strip extending from an adjoining side edge of each of the at least two adjoining panels. The flange strip includes a plurality of cleat tabs along an edge of the flange strip. The rail lock and cleat tab joining structure also includes a rail lock having a plurality of taper locks. Each cleat tab of a first panel of at least two adjoining panels is substantially aligned with each cleat tab of a second panel of at least two adjoining panels to form a pair of aligned cleat tabs. The pair of aligned cleat tabs is captured together by an interference fit with tapered edges of each corresponding taper lock to form a seam joining the first panel to the second panel.

In one embodiment, the at least two adjoining panels include adjacent side wall panels.

In another embodiment, the flange strip has a bend angle of between about 85 degrees to 120 degrees with respect to a panel from which the flange strip is bent or formed.

In yet another embodiment, the rail lock includes about a right angle bend along a rail lock center longitudinal axis.

In yet another embodiment, the rail lock includes a plurality of triangular shaped taper lock openings.

In yet another embodiment, the rail lock includes at least one mounting angle at an end of the rail lock.

In yet another embodiment, at least one mounting angle includes about a right angle to secure the mounting angle to an adjacent about perpendicular surface.

In yet another embodiment, at least one mounting angle includes a cylindrical wall defining a mounting hole through the mounting angle.

In yet another embodiment, the mounting hole accepts a threaded bolt extending from either a top cabinet surface or a bottom cabinet surface, the threaded bolt securing the rail lock mounting angle to the top cabinet surface or the bottom cabinet surface by a threaded nut.

In yet another embodiment, the threaded bolt includes a threaded bolt press fit into the top cabinet surface or a bottom cabinet surface presenting a substantially flat exterior surface.

In yet another embodiment, each of the cleat tabs includes a tapered cleat edge disposed between a cleat point and a cleat vertex.

In yet another embodiment, a tapered opening formed between the tapered cleat edge and a strip edge forms about a triangular opening.

In yet another embodiment, the cabinet includes a gun cabinet.

In yet another embodiment, the cabinet includes a shelter enclosure.

In yet another embodiment, a seam formed between each of the flange strips of each of the at least two adjoining panels is substantially free of an open gap.

According to another aspect, a gun cabinet includes a bottom panel including at least four rail lock fastening positions. A top panel includes at least four rail lock fastening positions. A back panel has two short walls on opposite sides of the back panel. Each short wall has a flange strip including a plurality of cleat tabs. A front panel has two short walls on opposite sides of the front panel, each short wall having a flange strip including a plurality of cleat tabs. Each side wall has a pair of flange strips. Each flange strip includes a plurality of cleat tabs. Each rail lock of a plurality of rail locks includes a plurality of taper locks corresponding to a pair of cleat tabs. Each taper lock joins each pair of cleat tabs in an adjoining pair of cleat tabs locked position. Each rail lock includes at least one mounting angle having a cylindrical wall defining a through hole through which a fastener secured the rail lock to each one of at least four rail lock fastening positions of the bottom panel and the top panel.

According to yet another aspect, a safety shelter or safe room includes a bottom surface of a prepared floor surface or a shelter bottom panel which includes at least four rail lock fastening positions. A top shelter panel includes at least four rail lock fastening positions. A back shelter panel has two short walls on opposite sides of the back shelter panel. Each short wall has a flange strip including a plurality of cleat tabs. A front shelter panel has two short walls on opposite sides of the front shelter panel. Each short wall has a flange strip including a plurality of cleat tabs. Each shelter side wall has a pair of flange strips, each flange strip including a plurality of cleat tabs. Each rail lock of a plurality of rail locks includes a plurality of taper locks corresponding to a pair of cleat tabs, each taper lock to join the pair of cleat tabs in an adjoining pair of cleat tabs locked position. Each rail lock includes at least one mounting angle having a cylindrical wall defining a through hole through which a fastener secured the rail lock to each one of at least four rail lock fastening positions of the prepared floor surface or the shelter bottom panel, and the top shelter panel.

A method for joining two adjacent panels includes: providing at least two panels to be joined together, each panel including a flange strip extending from an adjoining side edge of each of the at least two panels, the flange strip including a plurality of cleat tabs along an edge of the flange strip; providing a rail lock including a plurality of taper locks; aligning each cleat tab of a first panel of the at least two panels substantially together where each cleat tab of a second panel of the at least two panels to form a pair of aligned cleat tabs; and capturing each of the pair of aligned cleat tabs together by an interference fit with tapered edges of each corresponding taper lock to form a tight seam joining the first panel to the second panel.

In one embodiment, the step of providing a rail lock includes providing a rail lock including a mounting angle, and following the step of aligning each cleat tab, there is a step of fastening the mounting angle to an about perpendicular adjoining surface.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 4A shows an isometric drawing of an assembled cabinet of FIG. 3;

FIG. 4B shows a top view of the cabinet of FIG. 4A;

FIG. 4C shows a front view of the cabinet of FIG. 4A;

FIG. 4D shows a side view of the cabinet of FIG. 4A;

FIG. 5A shows an isometric drawing of an exemplary back panel of a cabinet;

FIG. 5B shows a top drawing of the back panel of FIG. 5A;

FIG. 5C shows an inside view of the back panel of FIG. 5A;

FIG. 5D shows exemplary dimensions of a cleat tab suitable for use in gun cabinet;

FIG. 6A shows an isometric view of an exemplary rail lock;

FIG. 6B shows a side view of the rail lock of FIG. 6A;

FIG. 6C shows dimensions of an exemplary rail lock suitable for use in a cabinet;

FIG. 6D shows a top view of the rail lock of FIG. 6A;

FIG. 6E shows a bottom view of the rail lock of FIG. 6A;

DETAILED DESCRIPTION

Figure 1A:
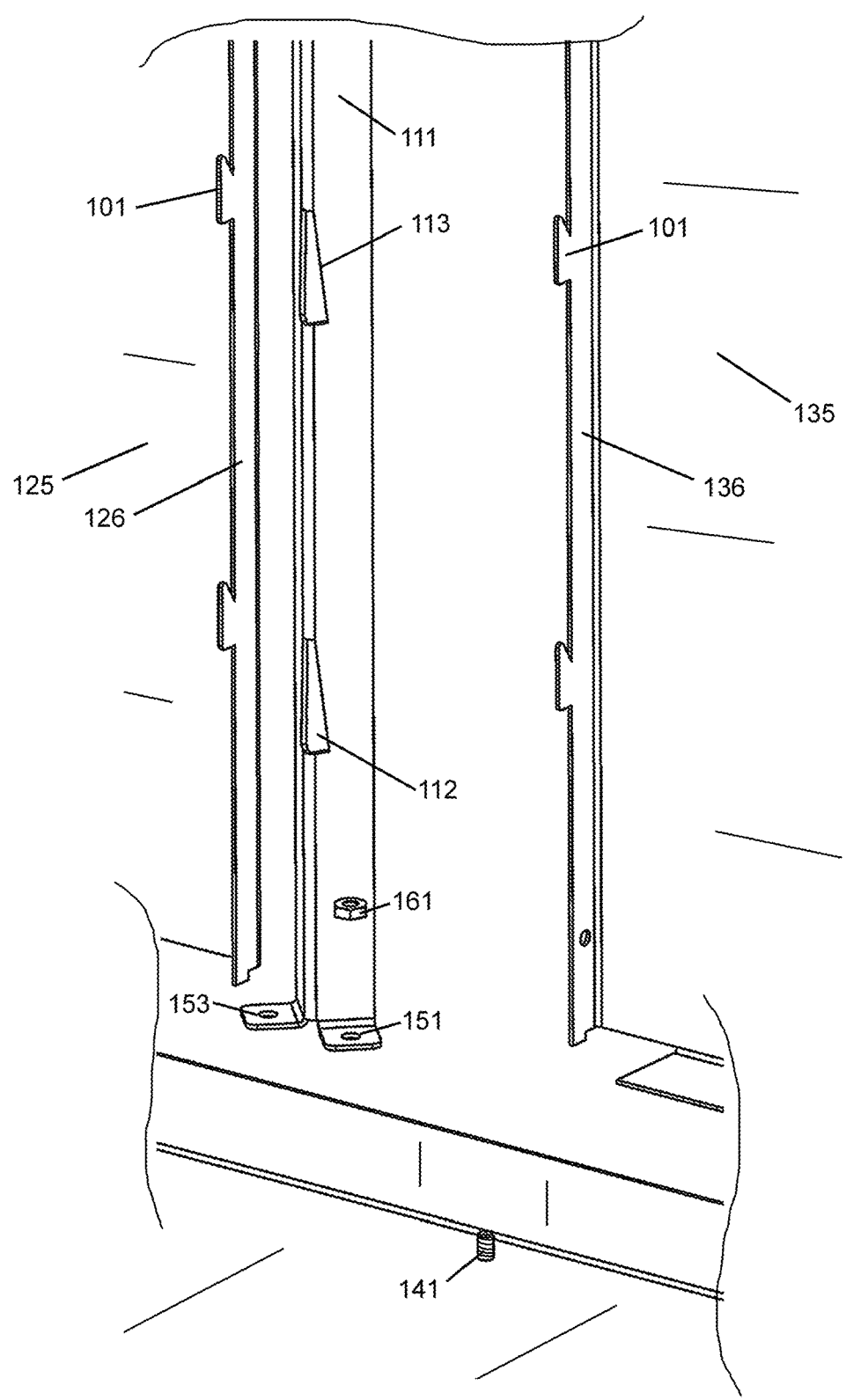
FIG. 1A shows exemplary structures of the new system and method for joining panels.

List of Reference Designators 101 cleat tabs (102, 103, 104, 106)
102 side cleat edge
103 top cleat edge
104 point of cleat tab
105 tapered cleat edge
106 vertex between the cleat tab tapered cleat edge and the strip edge
107 strip edge
111 rail lock (including taper locks 113)
112 tapered opening
113 taper lock (defining tapered opening 112 by 115, 116, 118, 119)
115, 117 tapered edges
116, 118 base edges
119 vertex edge
125, 135 panels
126, 136 flange strips
141 threaded mounting post
151, 153 mounting angles
161 nut
302 back
303 side panels
304 door
306 front assembly
307 door cover
308 door hinge
322, 326 short walls
401 tight gapless seams
403 thin walls FIG. 1A shows exemplary structures of the new system and method for joining panels. In the example of FIG. 1A, panel 125 is to be joined to panel 135. The adjoining edges of both panels include an angled edge. The angled edge provides adjoining strips with surfaces which face each other. Panel 125 has flange strip 126, and panel 135 has flange strip 136. Such flange strips 126, 136 can be made by any suitable means. In the example of FIG. 1A, flange strips 126, 136 were made by bending the end sides of panels 125, 135 at about a right angle. For reasons which will be apparent in the more detailed description hereinbelow, the bend angle of the flange strip can also be slightly greater than 90 degrees, such as, for example, in a range of about 85 degrees to 120 degrees. One edge of each strip opposite the bend there are a plurality of cleat tabs 101. A rail lock 111 having tapered openings 112 joins the two panels by accepting the cleat tabs 101 into corresponding tapered openings 112 as is described in more detail hereinbelow.

Figure 1B:
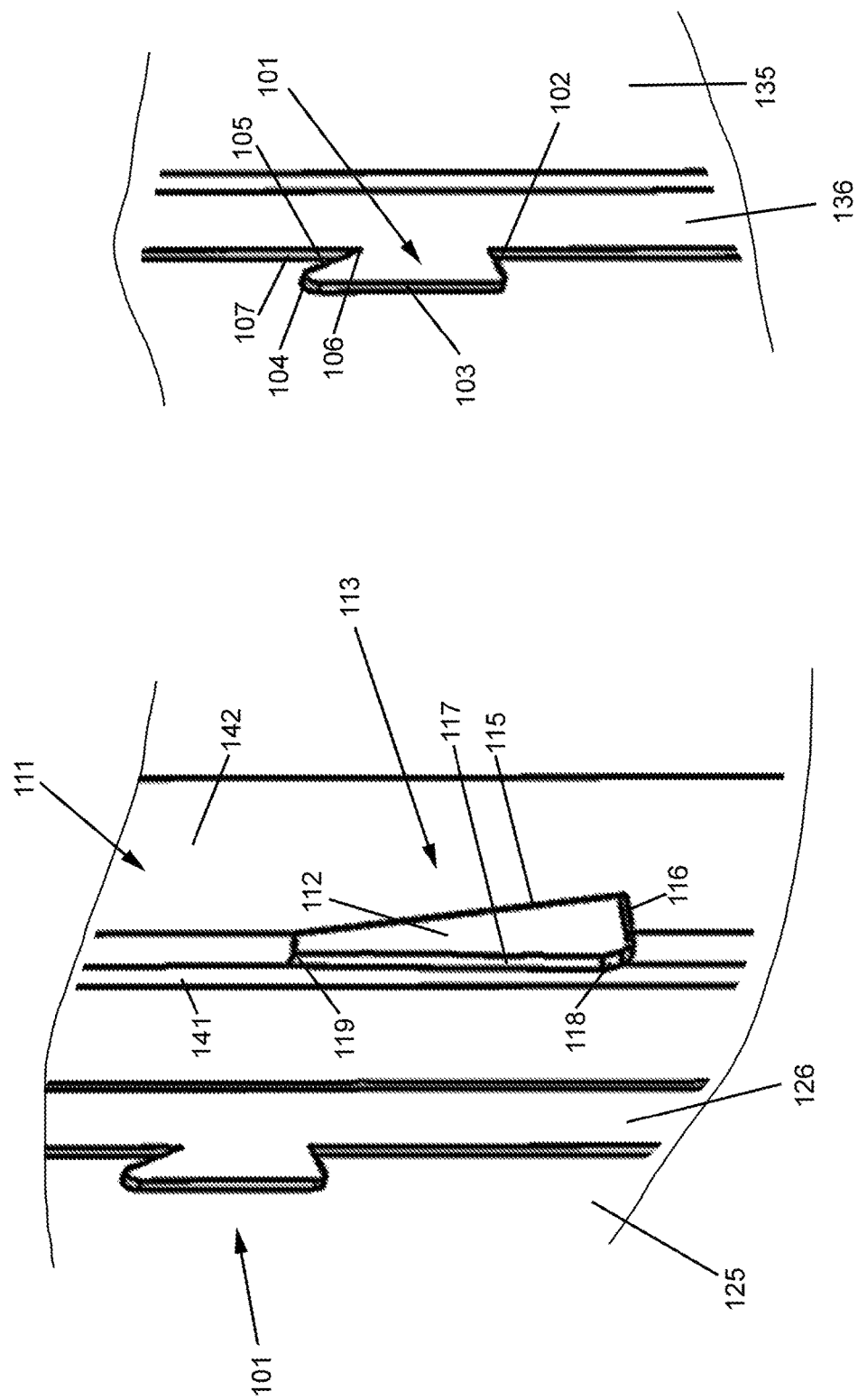
FIG. 1B shows a more detailed view of the cleat tabs of the panels, and the tapered openings of the rail lock of FIG. 1A.

FIG. 1B shows a more detailed view of the cleat tabs 101 of the panels 125, 135, and the tapered openings 112 of the rail lock 111.

Each cleat tab 101 includes a first side cleat edge about perpendicular to a long edges of the strips 126, 136 and a top cleat edge 103 about parallel to the long edges of the strips 126, 136. The top cleat edge 103 defines the height of the cleat tab 101 over the long edges of the strips 126, 136, and the side cleat edge 102 in part defines the width of each cleat tab 101. At the end of top cleat edge 103 opposite from side cleat edge 102 there is a tapered cleat edge 105 between a point 104 and a vertex 106 formed by the strip edge 107. In some embodiments, as shown in FIG. 1B, the vertex 106 is a vertex of a triangular shaped opening defined by strip edge 107 and tapered cleat edge 105.

Each taper lock 113 of rail lock 111 is defined by a plurality of edges. In the exemplary embodiment of FIG. 1B, there are two tapered opening tapered edges 115, 117, two base edges 116, 118, and a tapered opening vertex edge 119. The exemplary tapered opening 112 defined by the two tapered opening tapered edges 115, 117, two base edges 116, 118, and a tapered opening vertex edge 119 forms a triangle shaped opening. The cuts into rail lock 111 which provide the openings 112 can be made into a flat stock strip or bar which is then bent lengthwise to about a 90-degree bend to form the rail lock 111. Or, the openings 112 can be cut or formed by any suitable means in an already angled stock bar or rail. The bar or rail can also be bent or formed typically after the openings 112 are made in a bar or strips of sheet stock to have about a right angle bend along a rail lock longitudinal axis.

Any of the cuts described hereinabove for the panels, strips, cleat tabs, rail locks, tapered openings, etc., can be made by any suitable means, such as for example, by laser, water jet, fluid jet, saw, flame, plasma, etc.

The panels and rail locks can be made from any suitable materials. The exemplary structures of FIG. 1A, FIG. 1B were made from metal. The metal was a cold rolled steel. However, any materials which can be shaped, formed, or cut to have the cleat tab structures and rail lock with tapered opening is believed to be suitable for use with the new system and method for joining panels described herein.

In most embodiments, once installed as described in more detail hereinbelow, the rail lock 111 is bolted to a floor, such as a floor panel, or any other suitable floor surface. In the exemplary embodiment of FIG. 1A, rail lock mounting angles 151 and 153 include holes for mounting to a floor panel. For example, a threaded mounting post, such as a PEM™ or similar type threaded mounting post 141 can be used to secure the rail lock 111 in the panel joined locked position using any suitable nut 161. While one mounting angle 151 is bolted to the floor surface in the example, there can be two fasteners to fasten both rail lock mounting angles 151 and 153 to the floor panel.

Figure 2:
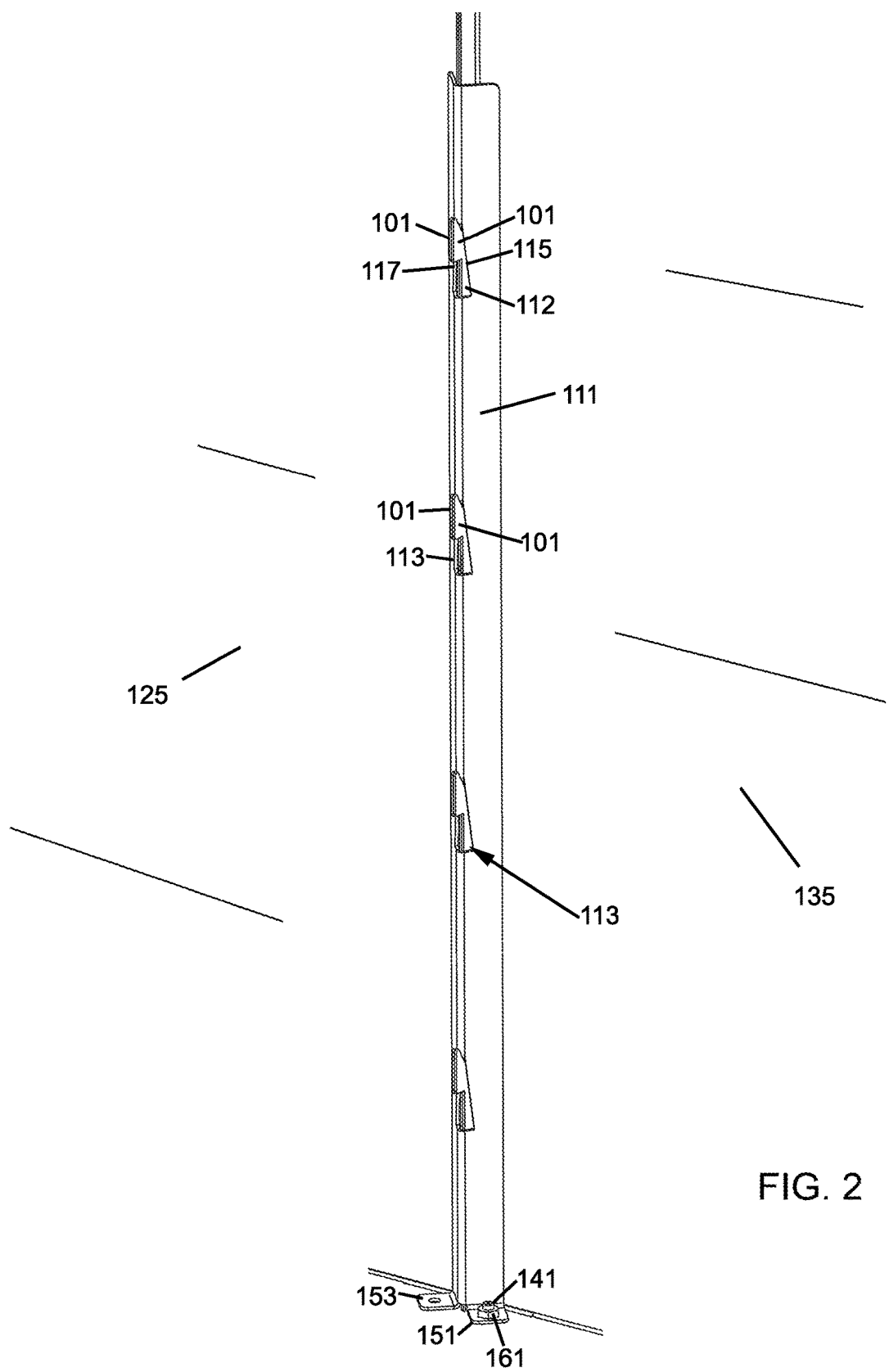
FIG. 2 shows a drawing of panels joined together by cleat tabs and a rail lock.

FIG. 2 is a drawing showing the exemplary panels 125 and 135 of FIG. 1A joined together by the new system and method of joining adjacent panels using the cleat tabs and a rail lock. The panels 125, 135 are placed adjacent to one another so that the corresponding cleat tabs 101 about match. The rail lock 111 is placed over the the strips 126, 136 so that the cleat tabs 101 of both adjacent panels protrude through the tapered openings 112 of rail lock 111. Rail lock 111 is slid towards the floor surface or floor panel such that the opening defined by strip edge 107 and tapered cleat edge 105 of the two now adjacently joined cleat tabs 101 allows the points 104 or cleats of the cleat tabs 101 to ride past the vertex edge 119 of the taper lock 113. Also, the two tapered opening tapered edges 115, 117 force each pair of cleat tabs together. Once the panels 125, 135 are so joined by the rail lock 111, the rail lock 111 can be secured in place, such as to a floor panel by bolting mounting angle 151 to the floor panel by assembly a nut 161 onto threaded post 141.

Threaded post 141 can be a threaded bolt press fit into a top cabinet surface or a bottom cabinet surface presenting a substantially flat exterior surface. That way, there is no exterior access to a bolt head, which could accept a driver, such as, for example a Philips, Allen, or straight driver bit. Such construction where the head of a threaded post 141 presents a substantially flat surface, e.g. flat with a top or bottom panel surface, provides a robust tamper and theft resistant construction. A PEM™ type threaded post fastener which can be press fit into a panel is but one example of a suitable threaded post fastener.

It was realized that the taper of a cleat tab can be combined with a taper lock of a rail lock bar to create a fast, efficient, and strong joint between two panels. No tools are needed to set two panels adjacent to each other and to place and slide the rail lock into the locked position. Finally, any suitable nut driver can be used to install one or two nuts or other suitable fasteners to secure the installed and locked rail lock to a floor panel or to a floor surface. As described in more detail hereinbelow, there can also be a similar rail lock installed and secured to a top surface or top panel. Typically, two rail locks will be used per pair of joined panels. However, where only one rail lock used a rail lock mounting angle can be secured to any suitable adjoining surface (typically a bottom (e.g. floor) or a top (e.g. top panel or a ceiling surface) by any suitable fastening means.

As described hereinabove, the bend angle of the flange strip (e.g. FIG. 1A, flange strips 126, 136) can also be slightly greater than 90-degrees, such as, for example, in a range of about 85 degrees to 120 degrees with respect to the panel from which the flange strips are bent or formed (e.g. panels 125, 135, FIG. 1A). For bends other than 90-degrees, preferably over 90-degrees, there is introduced an additional spring bias between pairs of adjacent cleat tabs 101. The spring bias creates additional locking strength to the lock created by the tapered opening of each cleat tab (e.g. the tapered opening formed by tapered cleat edge 105 and the strip edge 107) forced into each corresponding taper lock (e.g. FIG. 1B, FIG. 2, where the tapered edges 115, 117 force each pair of cleat tabs together) of the lock rail.

There is a need for a gun cabinet that can be shipped in a compact flat shipping package. There is also a need for a gun cabinet that can be assembled without need for welding or a large number of fasteners. There is also a need for a strong, robust, pry tool resistant gun cabinet which is easy and fast to assemble.

The new system and method of joining adjacent panels using the cleat tabs and a rail lock was realized and developed initially to join metal panels of a gun cabinet. Such cabinets range from home and shelter gun storage cabinets to cabinets of a variety of sizes and configurations used by police and the armed forces for storing tactical weapons in both fixed cabinet installations and mobile cabinets (e.g. police and military vehicles, ships, aircraft, etc.).

While the new system and method of joining adjacent panels using the cleat tabs and a rail lock turned out to be surprisingly easy and fast to assemble or to disassemble, one of the motivations that led to the new system and method was to be able to more easily ship disassembled cabinets. For example, a full sized gun cabinet can be shipped in a flat box of panels and rail locks in some embodiments under 100 lbs. total flat box packing weight. While still an effort to move and deliver, cabinets so packed can be shipped economically by most common commercial carriers. Moreover, because the cabinets are shipped in flat boxes, they take up far less shipping room than the alternative of shipping fully assembled cabinets.

Cabinets assembled using the new system and method of joining adjacent panels using the cleat tabs and a rail lock turned out to have a surprising strength and rigidity. The tight seams also proved to be highly resistant to pry bar insertion because there is no opening in the seam following the tight joining offered by the tapered locking mechanism of the taper locks combined with the tapered cleat tabs.

Following the successful application of the new system and method of joining adjacent panels using the cleat tabs and a rail lock, it was realized that the system and method can be applied to other panel joining applications. For example, many types of survival shelters, such as storm shelters built in regions of high tornadic activity are based on joining steel panels. It is contemplated that such shelters could be manufactured and shipped flat using the cleat tabs and a rail lock joining techniques described hereinabove. There could be at least one set of rail locks which are secured to the floor of the shelter, such as, for example, via threaded bolts anchored in a shelter concrete floor (e.g. by use of Red™ head concrete anchors or equivalent threaded posts). There could be alternatively or more likely, additional mounted rail locks to a top ceiling panel or ceiling surface.

Figure 3:
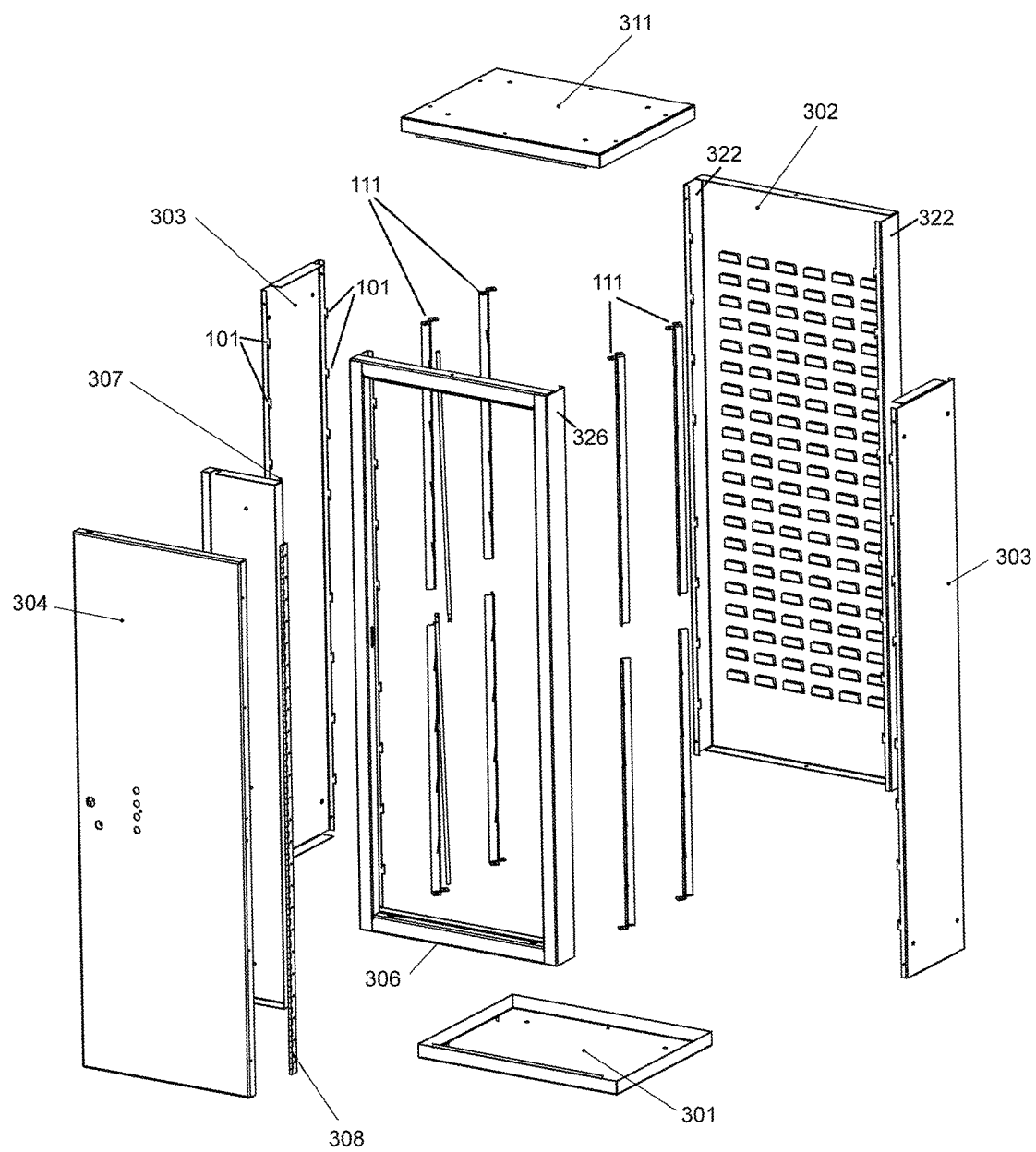
FIG. 3 shows a drawing of an exploded view of an exemplary gun cabinet according to the new system and method of joining adjacent panels using the cleat tabs and a rail lock.

FIG. 3 shows a drawing of an exploded view of one exemplary gun cabinet according to the new system and method of joining adjacent panels using the cleat tabs and a rail lock. The side panels 303 are joined to short walls 322 of the back 302 and short walls 326 of the front assembly 306 by cleat tabs 101 and rail locks 111 as described hereinabove. At each panel joint, there is a top rail lock 111 and a bottom rail lock 111. At least one mounting angle of each of the four bottom rail locks 111 is bolted to a threaded post in the bottom panel 301. At least one mounting angle of each of the four top rail locks 111 is bolted to a post in the top panel 311. Note that the direction of the cleats (e.g. point 104) of each cleat tab 101 is oriented or pointed in the opposite direction that the rail lock slides to lock the two adjoining panels together. In the cabinet example of FIG. 3, the cleat tabs 101 of the lower or bottom rail locks point up because the corresponding rail lock 111 slides down to lock the pairs of cleat tabs 101 and to lower the mounting angle of the lower rail locks over the threaded bolts protruding up from the base plate (bottom panel 301). Similarly, the cleat tabs 101 of the upper or top rail locks point down because the corresponding rail lock 111 slides up to lock the pairs of cleat tabs 101 and to raise the mounting angle of the lower rail locks over the threaded bolts protruding down from the tip plate 311. Door 304, door cover 307, and door hinge 308 couple to the front assembly 306 in conventional ways unrelated to the new panel joining technique of cleat tabs and rail locks.

The panels, particularly back 302, and the front assembly 306 can be compactly packed in a flat packing box for relatively low cost and by conventional shippers. Rail locks 111, bottom panel 301, top plate 311 and sides panels 303 can fit in the voids provided by short walls 322 and 326. Assembly is efficient, quick, and easy. To begin assembly, one or more persons simply positions, for example, the back panel 302 and a side panel 303 with the corresponding cleat tabs 101 about adjacent to each other. The lower lock rail 111 is roughly aligned by placing the tapered openings 112 of each taper lock 113 about in alignment with the lower cleat tabs 101. The lock rail is moved in towards the panel seam to be made by having the cleat tabs 101 protrude through each of the tapered openings 112 in the rail lock 111. The rail lock is pushed to slide it so that each pair of corresponding cleat tabs 101 is joined together and the cleats or points 104 of both cleat tabs lock over the the vertex edge 119 of each taper lock 113. The cleat tabs 101 have been positioned on both of the panels so that when the rail lock 111 has slid to sufficiently secure and lock the two adjacent panels together with a tight seam, the hole of the mounting angle has passed over the threaded post and is either resting on the surface of the perpendicular plate (e.g. the bottom plate), or is ready to be snugged up to the surface of the perpendicular plate by tightening the threaded nut onto the threaded post to secure the mounting angle of the rail lock to the perpendicular plate. Each of the remaining three bottom rail locks, and each of the four top rail locks are similarly installed.

Now referring back generally to the exemplary drawings of FIG. 1A to FIG. 3, a cabinet includes a plurality of cabinet panels 125, 135 coupled together to form a cabinet. At least two adjoining panels 125, 135 of the plurality of cabinet panels are joined together by a rail lock 111 and cleat tab 101 joining structure which includes a flange strip 126, 136 extending from an adjoining side edge of each of the at least two adjoining panels 125, 135. The flange strip 126, 136 includes a plurality of cleat tabs 101 along an edge of the flange strip 126, 136. The rail lock 111 and cleat tab 101 joining structure also includes a rail lock 111 having a plurality of taper locks 113. Each cleat tab 101 of a first panel 125 of the at least two adjoining panels is substantially aligned with each cleat tab 101 of a second panel 135 of the at least two adjoining panels to form a pair of aligned cleat tabs. The pair of aligned cleat tabs is captured together by an interference fit with tapered edges 115, 117 of each corresponding taper lock 113 to form a seam (e.g. seam 401, FIG. 4D) joining the first panel to the second panel.

Also, referring back generally to the exemplary drawings of FIG. 1A to FIG. 3, a method for joining two adjacent panels includes: providing at least two panels 125, 135 to be joined together, each panel including a flange strip 126, 136 extending from an adjoining side edge of each of the at least two panels, the flange strip 126, 136 including a plurality of cleat tabs 101 along an edge of the flange strip 126, 136; providing a rail lock 111 including a plurality of taper locks 113; aligning each cleat tab 101 of a first panel 125 of the at least two panels substantially together where each cleat tab 101 of a second panel 135 of the at least two panels to form a pair of aligned cleat tabs; and capturing each of the pair of aligned cleat tabs together by an interference fit with tapered edges of each corresponding taper lock 113 to form a tight seam (e.g. seam 401, FIG. 4D) joining the first panel to the second panel.

FIG. 4A shows an isometric drawing of an assembled cabinet of FIG. 3. FIG. 4B shows a top view of the cabinet of FIG. 4A, illustrating the tight gapless seams 401 between the adjacent panels joined by cleat tabs and rail locks. FIG. 4C is a drawing showing a front view of the cabinet of FIG. 4A. FIG. 4D is a drawing showing a side view of the cabinet of FIG. 4A. In FIG. 4B, the small circles represent the location of the threaded posts on the top panel 311. The larger small holes are for handling the panel during metal treatments and or painting and/or for cabinet ventilation. Thin walls 403 on both the bottom panel 301 and the top panel 311 deter pry tool access to the walls 322, 326, and 303.

FIG. 5A shows an isometric drawing of back 302. FIG. 5B shows a top drawing of the back of FIG. 5A. FIG. 5C shows an inside view of back 302. On each short wall 322 there can be seen two sets of cleat tabs 101. The lower set of cleat tabs point up towards the top panel 311 (points 104, FIG. 1B facing towards the top panel 311). The upper set of cleat tabs 101 point down towards the bottom panel 301. FIG. 5D shows exemplary dimensions of a cleat tab suitable for use in gun cabinet. The exemplary cleat tab 101 of FIG. D has a side cleat edge 102 of 0.25 inches, an about 0.05" radius at the end of side cleat edge 102 opposite strip edge 107 of the rail lock 111, about a 0.81" long top cleat edge 103, about 0.57" between the side cleat edge 102 and vertex 106 formed in line with strip edge 107, about a 30-degree cleat angle between tapered cleat edge 105 and strip edge 107.

Figure 6F:
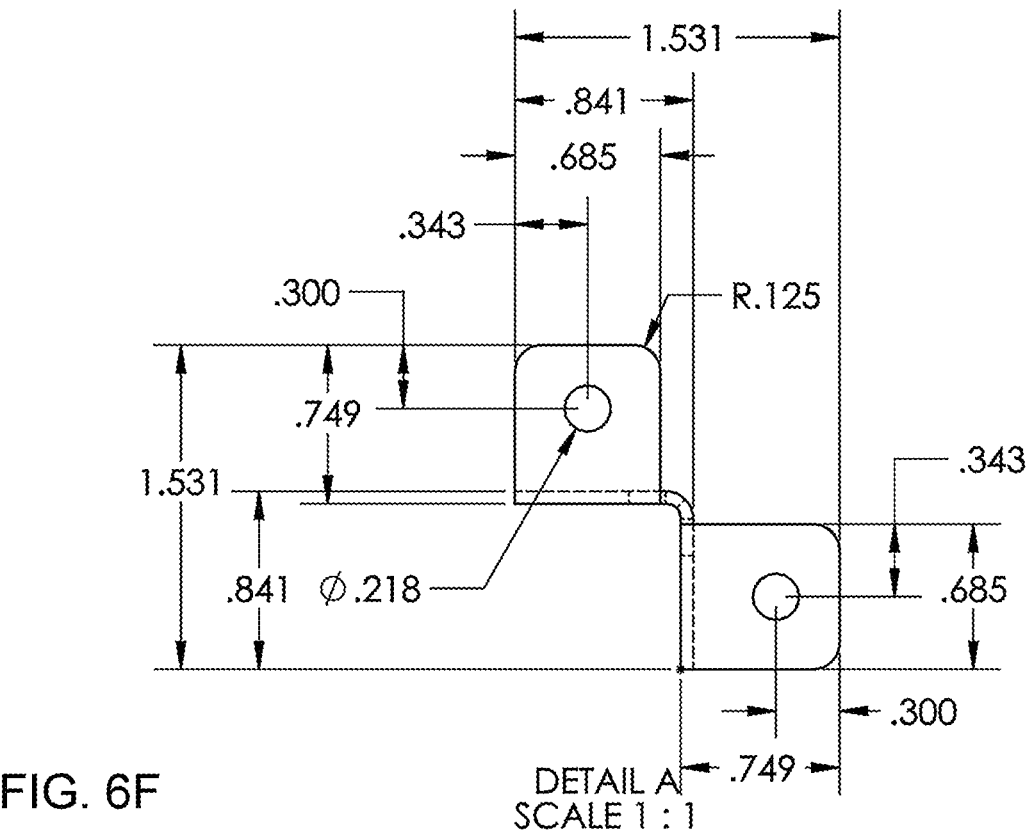
FIG. 6F shows dimensions of exemplary angle mounts.
Figure 6G:
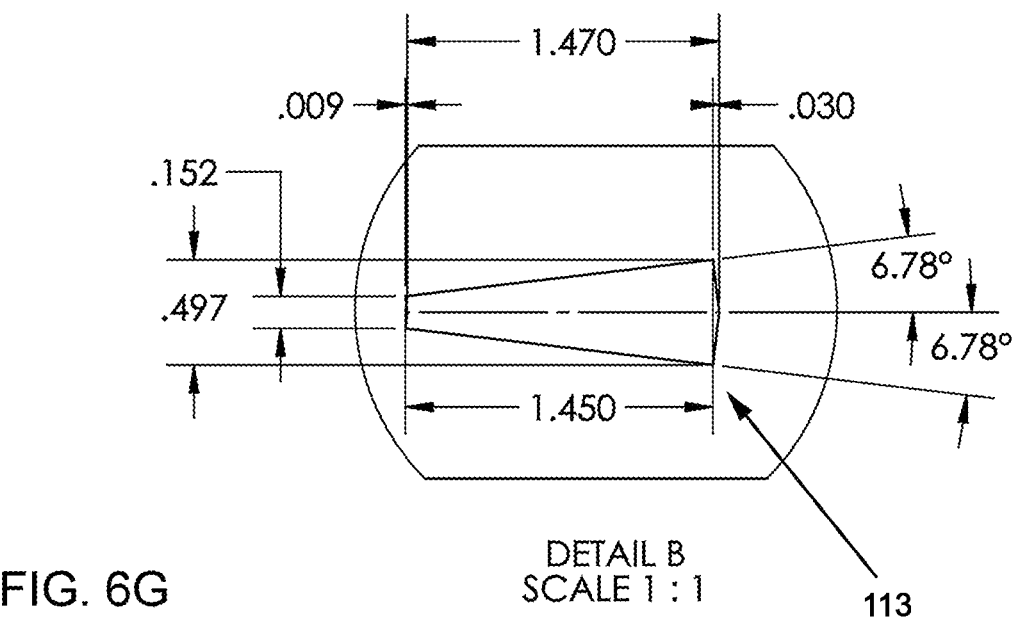
FIG. 6G shows dimensions of an exemplary tapered lock suitable for a cabinet.

FIG. 6A shows an isometric view of a rail lock 111. FIG. 6B shows a side view of the rail lock 111 of FIG. 6A. Taper lock 113 can be seen in FIG. 6B. FIG. 6C shows the dimensions of an exemplary rail lock suitable for use in a gun cabinet. The spacing between tapered locks is about 5.5". The spacing from the last tapered lock 113 to the mount angles 151, 153 is about 3.6". The thickness of the exemplary mount angles is about 0.06". FIG. 6D shows a top view of the rail lock 111 of FIG. 6A. The opening 112 created by the edges of each tapered lock 113 can be seen in FIG. 6D. FIG. 6E shows a bottom view of the rail lock 111 of FIG. 6A. FIG. 6F is a drawings showing dimensions of exemplary angle mounts 151, 153 suitable for a gun cabinet. FIG. 6G is a drawing showing dimensions of an exemplary tapered lock suitable for a gun cabinet.

Now referring back generally to the exemplary drawings of FIG. 4A to FIG. 6G, a gun cabinet includes a bottom panel 301 including at least four rail lock fastening positions (e.g. threaded posts 141, FIG. 2). A top panel 311 includes at least four rail lock fastening positions. A back panel 302 has two short walls 322 on opposite sides of the back panel. Each short wall 322 has a flange strip including a plurality of cleat tabs 101. A front panel 306 has two short walls 326 on opposite sides of the front panel, each short wall having a flange strip including a plurality of cleat tabs 101. Each side wall 303 of a pair of side walls has a pair of flange strips. Each flange strip includes a plurality of cleat tabs 101. Eight rail locks 111, each rail lock 111 include a plurality of taper locks 113 corresponding to a pair of cleat tabs. Each taper lock 113 joins each pair of cleat tabs in an adjoining pair of cleat tabs locked position. Each rail lock 111 includes at least one mounting angle (e.g. 151, FIG. 2) having a cylindrical wall defining a through hole through which a fastener secured the rail lock to each one of at least four rail lock fastening positions of the bottom panel 301 and the top panel 311.

Other building and structural applications: As described hereinabove, while the new system and method of joining adjacent panels using the cleat tabs and a rail lock was realized during development of a gun cabinet, the system and method is believed to be generally applicable to joining adjacent panels more generally. The techniques of joining panels are believed to be applicable for any type of cabinet. Moreover, the techniques are believed applicable to many types of structural construction where joining adjacent panels is common. For example, a small room, such as a home natural disaster safety shelter or a safe room in a home or business presents aspects of both a large cabinet and small construction project. In shelter construction, there is a bottom surface, which can, for example be a concrete floor, and a ceiling, which can be, for example, a ceiling panel. Each adjacent panel of the shelter can be joined together by cleat tabs and a rail locks. Rail locks, once installed over the pairs of adjacent cleat tabs, can be bolted, such as by bolting mounting angles to threaded studs from a concrete floor (e.g. Red™ head threaded studs) and to threaded studs from a ceiling panel (e.g. PEM™ threaded studs inserted into the ceiling panel).

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A cabinet comprising:
    a plurality of cabinet panels coupled together to form a cabinet, at least two adjoining panels of said plurality of cabinet panels joined together by a rail lock and cleat tab joining structure comprising:
        a flange strip extending from an adjoining side edge of each of said at least two adjoining panels, said flange strip comprising a plurality of cleat tabs along an edge of said flange strip, and
        a rail lock having a plurality of taper locks, said rail lock comprising about a right angle bend along a rail lock center longitudinal axis, each cleat tab of a first panel of said at least two adjoining panels substantially aligned with each cleat tab of a second panel of said at least two adjoining panels to form a pair of aligned cleat tabs, said pair of aligned cleat tabs captured together by an interference fit with tapered edges of each corresponding taper lock to form a seam joining said first panel to said second panel.

2. The cabinet of claim 1, wherein said at least two adjoining panels comprise adjacent side wall panels.

3. The cabinet of claim 1, wherein said flange strip has a bend angle of between about 85 degrees to 120 degrees with respect to a panel from which the flange strip is bent or formed.

4. The cabinet of claim 1, wherein said rail lock comprises at least one mounting angle at an end of said rail lock.

5. The cabinet of claim 4, wherein said at least one mounting angle comprises about a right angle to secure said mounting angle to an adjacent about perpendicular surface.

6. The cabinet of claim 4, wherein said at least one mounting angle comprises a cylindrical wall defining a mounting hole through said mounting angle.

7. The cabinet of claim 6, wherein said mounting hole accepts a threaded bolt extending from either a top cabinet surface or a bottom cabinet surface, said threaded bolt securing said rail lock mounting angle to said top cabinet surface or said bottom cabinet surface by a threaded nut.

8. The cabinet of claim 7, wherein said threaded bolt comprises a threaded bolt press fit into said top cabinet surface or a bottom cabinet surface presenting a substantially flat exterior surface.

9. The cabinet of claim 1, wherein said cabinet comprises a gun cabinet.

10. The cabinet of claim 1, wherein a seam formed between each of said flange strips of each of said at least two adjoining panels is substantially free of an open gap.

11. A cabinet comprising:
    a plurality of cabinet panels coupled together to form a cabinet, at least two adjoining panels of said plurality of cabinet panels joined together by a rail lock and cleat tab joining structure comprising:
        a flange strip extending from an adjoining side edge of each of said at least two adjoining panels, said flange strip comprising a plurality of cleat tabs along an edge of said flange strip, and
        a rail lock having a plurality of taper locks, each of said cleat tabs comprising a tapered cleat edge disposed between a cleat point and a cleat vertex, each cleat tab of a first panel of said at least two adjoining panels substantially aligned with each cleat tab of a second panel of said at least two adjoining panels to form a pair of aligned cleat tabs, said pair of aligned cleat tabs captured together by an interference fit with tapered edges of each corresponding taper lock to form a seam joining said first panel to said second panel.

12. The cabinet of claim 11, wherein a tapered opening formed between said tapered cleat edge and a strip edge forms about a triangular opening.

13. A cabinet comprising:
    a plurality of cabinet panels coupled together to form a cabinet, at least two adjoining panels of said plurality of cabinet panels joined together by a rail lock and cleat tab joining structure comprising:
        a flange strip extending from an adjoining side edge of each of said at least two adjoining panels, said flange strip comprising a plurality of cleat tabs along an edge of said flange strip, and
        a rail lock having a plurality of taper locks and a plurality of triangular shaped taper lock openings, each cleat tab of a first panel of said at least two adjoining panels substantially aligned with each cleat tab of a second panel of said at least two adjoining panels to form a pair of aligned cleat tabs, said pair of aligned cleat tabs captured together by an interference fit with tapered edges of each corresponding taper lock to form a seam joining said first panel to said second panel.

14. The cabinet of claim 13, wherein said at least two adjoining panels comprise adjacent side wall panels.

15. The cabinet of claim 13, wherein said flange strip has a bend angle of between about 85 degrees to 120 degrees with respect to a panel from which the flange strip is bent or formed.

16. The cabinet of claim 13, wherein said rail lock comprises at least one mounting angle at an end of said rail lock.

17. The cabinet of claim 16, wherein said at least one mounting angle comprises about a right angle to secure said mounting angle to an adjacent about perpendicular surface.

18. The cabinet of claim 16, wherein said at least one mounting angle comprises a cylindrical wall defining a mounting hole through said mounting angle.

19. The cabinet of claim 18, wherein said mounting hole accepts a threaded bolt extending from either a top cabinet surface or a bottom cabinet surface, said threaded bolt securing said rail lock mounting angle to said top cabinet surface or said bottom cabinet surface by a threaded nut.

20. The cabinet of claim 19, wherein said threaded bolt comprises a threaded bolt press fit into said top cabinet surface or a bottom cabinet surface presenting a substantially flat exterior surface.

\* \* \* \* \*